United States Patent
Inch et al.

(10) Patent No.: US 8,810,956 B2
(45) Date of Patent: Aug. 19, 2014

(54) TECHNIQUE FOR OPTIMIZING SKEW IN THE PRESENCE OF TAPE MOTION

(75) Inventors: Randy Clark Inch, Tucson, AZ (US); Kevin Bruce Judd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 13/562,290

(22) Filed: Jul. 30, 2012

(65) Prior Publication Data

US 2014/0029125 A1 Jan. 30, 2014

(51) Int. Cl.
*G11B 20/20* (2006.01)
(52) U.S. Cl.
USPC ............... 360/76; 360/71; 360/75; 360/77.12
(58) Field of Classification Search
None
See application file for complete search history.

(56) References Cited

U.S. PATENT DOCUMENTS

| | | | |
|---|---|---|---|
| 3,800,280 A * | 3/1974 | Heffner | 714/700 |
| 4,414,587 A * | 11/1983 | Weaver et al. | 360/76 |
| 5,600,505 A * | 2/1997 | Ayres | 360/77.12 |
| 6,906,888 B1 | 6/2005 | Trabert et al. | |
| 7,538,966 B2 * | 5/2009 | Day | 360/76 |
| 7,660,069 B2 | 2/2010 | Trabert et al. | |
| 7,764,460 B2 * | 7/2010 | Bates et al. | 360/77.12 |
| 7,957,088 B1 * | 6/2011 | Bui et al. | 360/76 |
| 8,054,576 B2 * | 11/2011 | Bui et al. | 360/77.12 |
| 8,154,811 B2 * | 4/2012 | Barsotti et al. | 360/31 |
| 8,189,285 B1 * | 5/2012 | Spaur et al. | 360/76 |
| 8,643,975 B2 * | 2/2014 | Cherubini et al. | 360/76 |
| 2002/0163752 A1 * | 11/2002 | Peterson | 360/76 |
| 2006/0103968 A1 * | 5/2006 | Jurneke | 360/76 |

FOREIGN PATENT DOCUMENTS

JP 62195750 A 8/1987

* cited by examiner

*Primary Examiner* — Dismery Mercedes
(74) *Attorney, Agent, or Firm* — Nelson and Nelson; Daniel P. Nelson; Alexis V. Nelson

(57) ABSTRACT

A method for accurately adjusting skew in the presence of tape motion includes performing a calibration run of magnetic tape in a tape drive. During the calibration run, the method records skew readings at selected intervals. The method then finds a range associated with the skew readings, such as by finding a high and low skew reading. The method then finds a center point of the range, and a difference between the center point and a desired center point. The method applies the difference to each recorded skew reading to generate a target skew reading for each recorded skew reading. The method generates a skew error signal that reflects the difference between each recorded skew reading and each corresponding target skew reading. The skew error signal will generally be consistent even as the tape moves, thereby allowing a technician to easily adjust and optimize the skew.

24 Claims, 7 Drawing Sheets

TECHNIQUE FOR OPTIMIZING SKEW IN THE PRESENCE OF TAPE MOTION

BACKGROUND

1. Field of the Invention

This invention relates to apparatus and methods for reading and writing data on storage media such as magnetic tape.

2. Background of the Invention

In most tape drives, magnetic tape is passed between spools and over guiding elements such as rollers in order to direct the magnetic tape across a read/write head. The read/write head typically includes a number of write elements to write tracks on the magnetic tape, and an equivalent number of read elements to read back data from the magnetic tape as it is written. This allows the written data to be verified as it is written. In order to provide some leeway when reading back data, the read elements are typically narrower than the write elements, and thus narrower than the tracks they are reading back. This allows the read elements to read back data even if they are not exactly centered over the written tracks. However, if the misalignment between the read elements and the center of the written tracks is enough, a point may be reached where the read elements can no longer accurately read back the data.

The misalignment between the read elements and written tracks, which is generally caused by angular misalignment of the read/write head relative to the magnetic tape, is typically referred to as "skew." The greater angular misalignment of the read/write head relative to the tape, the greater the skew. As alluded to above, if the skew is large enough, the read elements may no longer be able to read back data from the magnetic tape.

In some tape drives, such as some LTO tape drives, the angle of the read/write head can be manually adjusted relative to the tape in order to minimize the skew. Unfortunately, shifts in the tape stack can cause the skew readings to change as the magnetic tape traverses across the head. Thus, adjusting the angle of the read/write head or the magnetic tape to minimize the skew can be like hitting a moving target. That is, a technician may adjust the angle to minimize the skew only to find that the skew later increases due to variations in the tape stack. Thus, a technician may have difficulty finding an optimal angular position for the tape head relative to the magnetic tape.

In view of the foregoing, what are needed are apparatus and methods for adjusting skew in the presence of tape motion. Ideally, such an apparatus and method will enable a technician to easily adjust the angular position of a tape head relative to the magnetic tape even while the tape is in motion.

SUMMARY

The invention has been developed in response to the present state of the art and, in particular, in response to the problems and needs in the art that have not yet been fully solved by currently available apparatus and methods. Accordingly, the invention has been developed to provide apparatus and methods for more accurately adjusting skew in the presence of tape motion. The features and advantages of the invention will become more fully apparent from the following description and appended claims, or may be learned by practice of the invention as set forth hereinafter.

Consistent with the foregoing, a method for accurately adjusting skew in the presence of tape motion is disclosed herein. In one embodiment, such a method includes performing a calibration run of magnetic tape in a tape drive. During the calibration run, the method records skew readings at selected intervals. The method then finds a range associated with the skew readings, such as by finding a high and low skew reading. The method then finds a center point of the range, and a difference between the center point and a desired center point. The method then applies the difference to each recorded skew reading to generate a target skew reading for each recorded skew reading. The method generates a skew error signal that reflects the difference between each recorded skew reading and each corresponding target skew reading. The skew error signal will generally be consistent even as the tape moves, thereby allowing a technician to easily adjust and optimize the skew.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
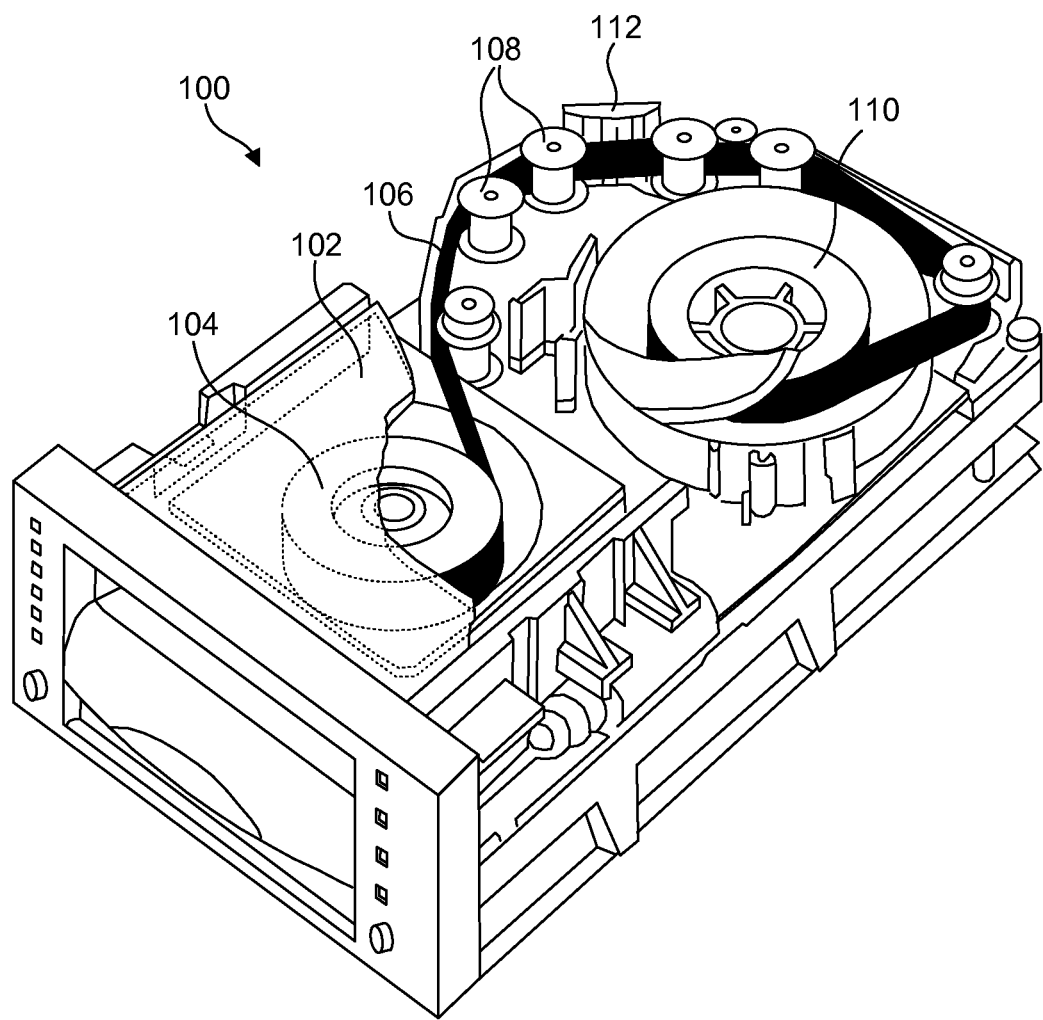
FIG. 1 is a perspective cutaway view of one embodiment of a tape drive configured to read/write data on magnetic tape.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may be implemented as a hardware embodiment, a software embodiment (including firmware, resident software, microcode, etc.) configured to operate hardware, or an embodiment combining both software and hardware elements. Each of these embodiments may be represented by one or more modules or blocks. Furthermore, the present invention may be implemented in a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example, but not limited to, an electronic, magnetic, optical, electromagnetic, infrared, or semiconductor system, apparatus, or device. More specific examples (a non-exhaustive list) of the computer-readable storage medium may include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain or store a program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a perspective view of one embodiment of a tape drive 100 is illustrated. The tape drive 100 is presented solely by way of example and is not intended to be limiting. The apparatus and methods disclosed herein may be applicable to many different types of tape drives 100 and not just the tape drive 100 shown.

As shown, in certain embodiments, a tape drive 100 may be configured to accept a cartridge 102 containing a spool of magnetic tape 106. Upon inserting the cartridge 102 into the tape drive 100, the tape drive 100 may retrieve the end of the tape 106 and pass the tape 106 over various guiding elements 108 (e.g., rollers 108) onto a take-up reel 110. As the magnetic tape 106 is spooled onto (or off of) the take-up real 110, the magnetic tape 106 may be translated across a read/write head 112 in order to write data to or read data from the magnetic tape 106. A read/write head 112 typically includes a number of write elements to simultaneously write multiple tracks to the magnetic tape 106, and an equivalent number of read elements to simultaneously read back data from the magnetic tape 106 as it is written. This allows data to be verified as it is written.

Figure 2:
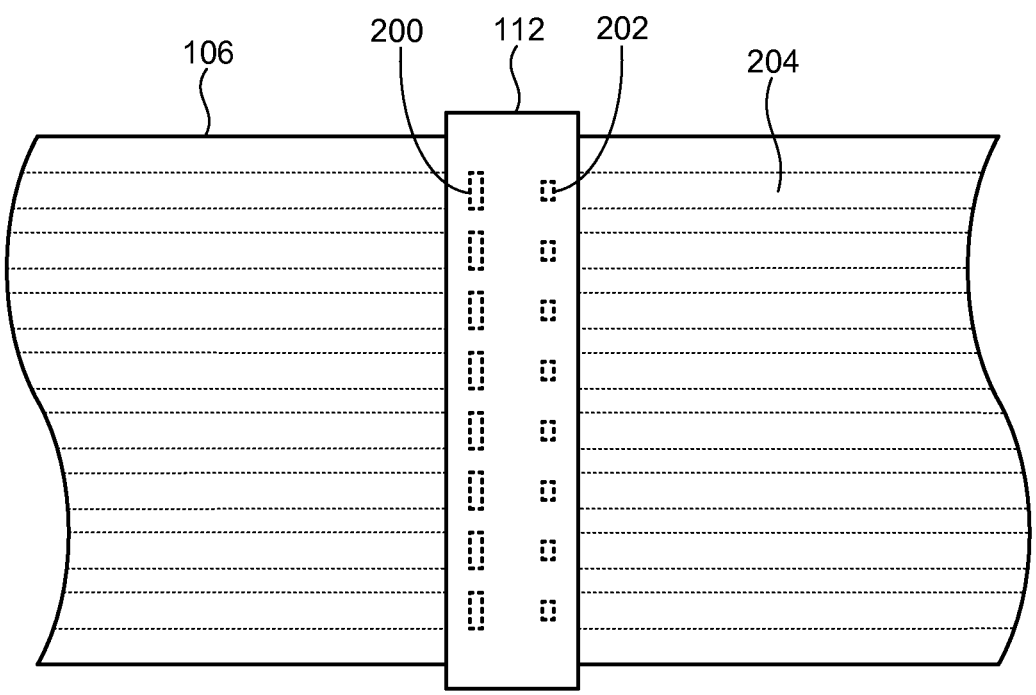
FIG. 2 is a high-level view of a read/write head comprising multiple write elements and multiple read elements configured to write data tracks and read back data tracks on magnetic tape.

Referring to FIG. 2, a high-level view of one embodiment of a read/write head 112 is illustrated. As shown the read/write head 112 includes a number of write elements 200 and an equivalent number of read elements 202. As magnetic tape 106 is translated across the read/write head 112, the write elements 200 may write tracks 204 to the magnetic tape 106 and the read elements 202 may read data back from the magnetic tape 106 to verify that the data was written correctly.

As shown, the read elements 202 are substantially narrower than their corresponding write elements 200, and thus narrower than the tracks 204 they are reading back. This allows the read elements 202 to read back data even if they are not exactly centered over the written tracks 204. However, if the misalignment between the read elements 202 and the center of the written tracks 204 is substantial enough, a point may be reached where the read elements 202 can no longer accurately read back data. That is, the misalignment may cause all or part of the read elements 202 to fall outside of the written tracks 204 such that they can no longer accurately read back data. The misalignment between the read elements 202 and written tracks 204 is generally caused by angular misalignment of the read/write head 112 relative to the magnetic tape 106. This angular misalignment will be discussed in more detail in association with FIGS. 3A and 3B. This angular misalignment is typically referred to as "skew" and may be caused by variations or shifts in the tape stack on the spools 104, 110 or variations in the tape position as it passes over various guiding elements 108.

In the illustrated embodiment, the read/write head 112 includes eight write elements 200 and eight corresponding read elements 202. This number is provided by way of example and not limitation. The disclosed apparatus and methods may be applicable to any number of write elements 200 and corresponding read elements 202. Furthermore, the relative sizes, dimensions, and spacings of the read and write elements 200, 202, as illustrated in FIG. 2, may not reflect real-world sizes, dimensions, and spacings.

Figure 3A:
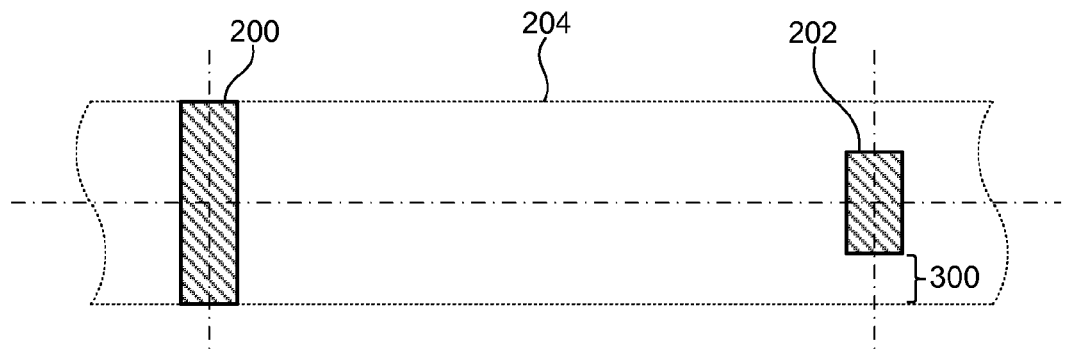
FIG. 3A is a high-level diagram showing a read element substantially centered over a written track.

Referring to FIG. 3A, a high-level diagram showing a read element 202 substantially centered over a written track 204 is illustrated. Such an arrangement may correspond to a skew measurement of zero. As shown in FIG. 3A, when the skew is zero, the read element 202 may fall entirely inside the written track 204, thereby allowing the read element 202 to effectively read data encoded in the track 204. Because the read element 202 is narrower than the corresponding write element 200, a certain distance 300 is present on either side of the read element 202. This distance 300 may allow the read element 202 to drift up or down some specified distance 300 relative to the track 204 while still remaining inside the track 204. If the read element 202 moves greater than the specified distance 300, all or part of the read element 202 may fall outside of the written track 204, thereby impairing the ability of the read element 202 to read back data.

Figure 3B:
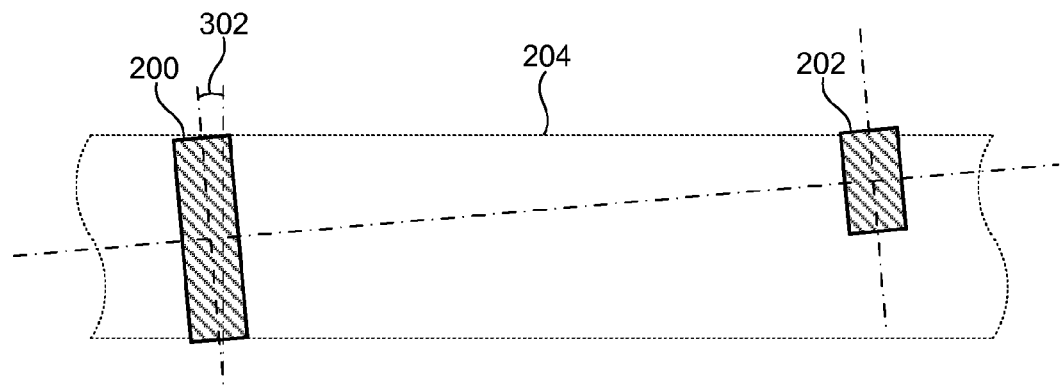
FIG. 3B is a high-level diagram showing misalignment of a read element over a written track.

Referring to FIG. 3B, a high-level diagram showing angular misalignment (i.e., skew) between a read element 202 and a written track 204 is illustrated. As shown, when magnetic tape 106 is translated across the read/write head 112, the skew may become large enough that all or part of the read element 202 may fall outside of the written track 204. As mentioned above, this may impair the read element's ability to read data encoded in the track 204.

In real-world situations, the skew may vary within some range, where the range has a maximum and a minimum value. As magnetic tape 106 used to calibrate a tape drive 100 is translated across the read/write head 112, the skew varies within this range. Unfortunately, trying to adjust the angular position of the read/write head 112 relative to the magnetic tape 106 to optimize the skew can be challenging when the tape is in motion.

Figure 4:
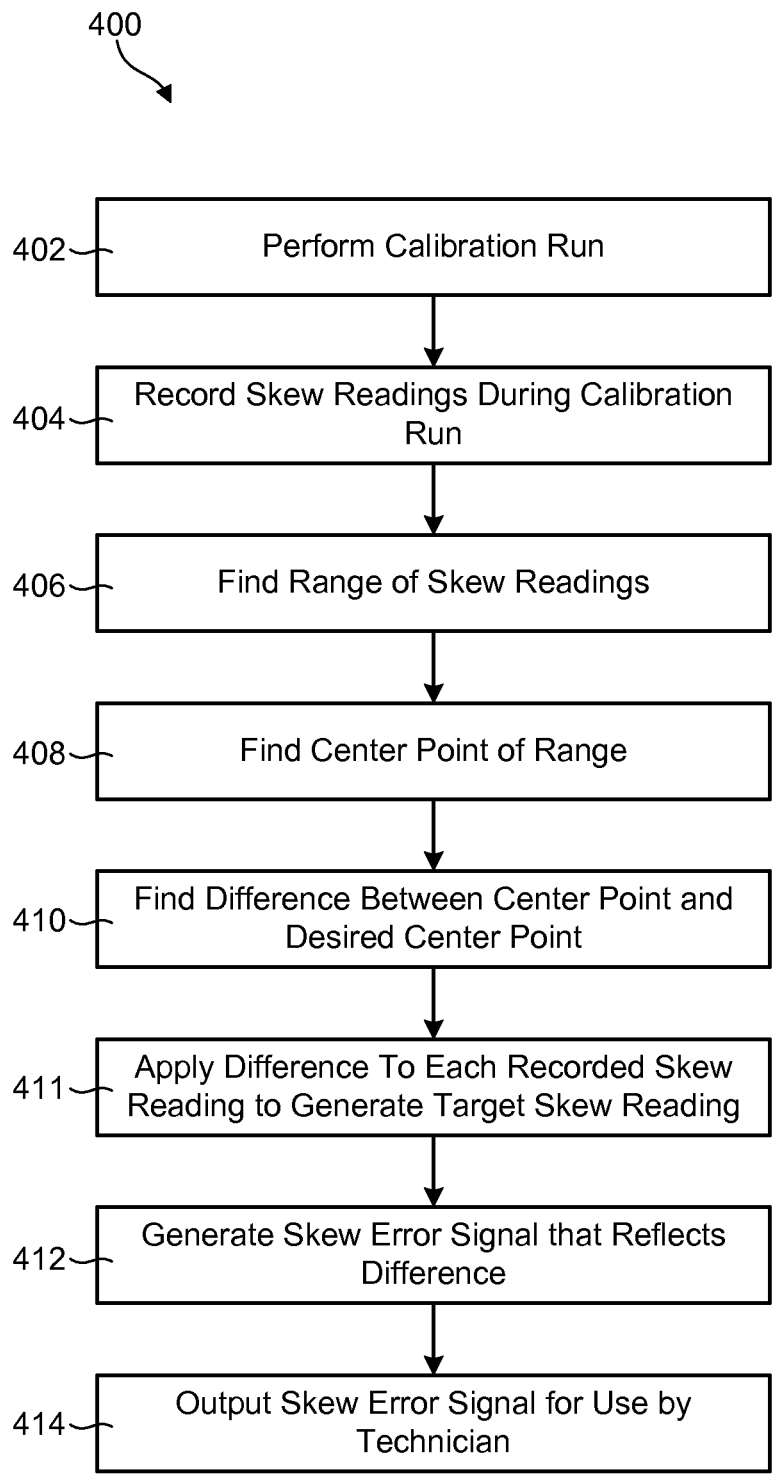
FIG. 4 is a process flow diagram showing one embodiment of a method for adjusting skew in the presence of tape motion.

For example, if the skew is at or near the top of the range and a technician tries to adjust the angular position of the read/write head 112 relative to the tape 106 at this time, the angular position may not be optimal when the skew is at or near the bottom of the range. Similarly, if the skew is at or near the bottom of the range and a technician tries to adjust the angular position of the read/write head 112 relative to the tape 106 at this time, the angular position may not be optimal when the skew is at or near the top of the range. Complicating the problem is the fact that a technician may not know the range or whether the skew is at the top or bottom of the range at any given time. Thus, techniques are needed to enable a technician to more effectively optimize skew (i.e., optimize the angular position of the read/write head 112 relative to the tape 106) in the presence of tape motion. One example of such a technique is illustrated in FIG. 4. It is important to note that it has been observed that for a given tape, the skew pattern is generally repeatable from run to run. That is, if a given tape is run multiple times in a tape drive, the same general pattern of up/down skew behavior will be observed in the tape drive.

Referring to FIG. 4, one embodiment of a method 400 for optimizing skew in the presence of tape motion is illustrated. As shown, the method 400 initially performs 402 a calibration run on the tape drive 100. In certain embodiments, such a step 402 includes inserting a tape cartridge 102 into the tape drive 100 for calibration purposes and operating the tape drive 100 such that the magnetic tape 106 of the tape cartridge 102 is translated across the read/write head 112. While performing the calibration run, the method 400 records 404 skew readings from the tape drive 100 at selected intervals, such as at selected time intervals or selected distance intervals along the magnetic tape 106. In certain embodiments, the skew readings may be received from the tape drive 100 and recorded at selected intervals by external devices or equipment.

Once the calibration run has ended and the skew readings are recorded, the method 400 may find 406 a range associated with the skew readings. This may be accomplished, for example, by determining a high skew reading and a low skew reading from the skew readings gathered at step 404. Once the range has been determined, the method may find 408 a center point of the range. This may be accomplished by adding the high skew reading and low skew reading and dividing by two. The method 400 then finds 410 how much the center point of the range differs from a desired center point. Most often, the desired center point will be zero since this corresponds to a read element 202 that is centered over the written track 204. Other desired center points, however, are possible and within the scope of the invention.

Figure 5:
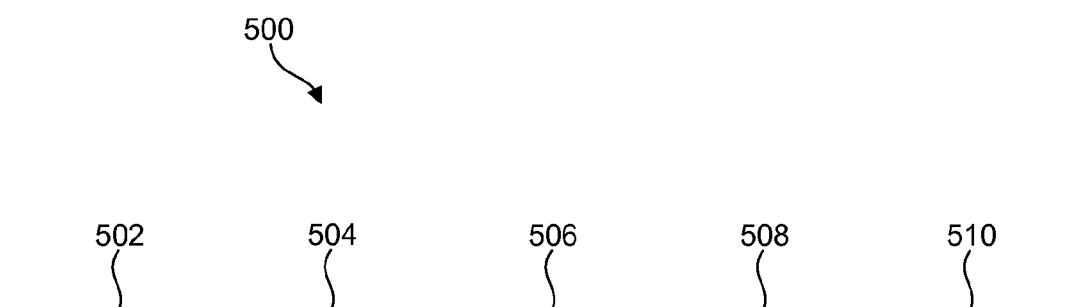
FIG. 5 is a table showing an example of skew readings and error signals prior to and after making adjustments to the skew.

The method 400 then applies 411 the difference to each recorded skew reading to generate a target skew reading for each reading recorded during the calibration run. The method then generates 412 and outputs 414 a skew error signal that reflects the difference between the target skew value and the actual skew value. Advantageously, even as actual skew readings change as the tape is translated across the read/write head 112, the skew error signal will stay substantially consistent since it is based on the difference between the target skew value and the actual skew value. This may be of great benefit to a technician who is attempting to adjust the angular position of the read/write head 112 relative to the tape 106. That is, instead of providing a skew value to the technician that changes as the tape moves, a substantially consistent error signal may be provided that indicates how much to adjust the angular position of the read/write head 112 relative to the tape 106. The technician may then simply adjust the angular position of the read/write head 112 relative to the tape 106 until the error signal is zero or close to zero. An example showing an actual implementation of the method 400 will be discussed in association with FIGS. 5, 6A, and 6B.

Referring to FIG. 5A, a table 500 showing an example of skew readings and error signals for a tape drive 100 prior to and after adjusting the skew is illustrated. In this example, assume that eleven skew readings are recorded while performing a calibration run of a tape drive 100 as described above in association with FIG. 4. The eleven skew readings are illustrated in the first column 502 of the table 500. The skew readings are also plotted in the graph 600a of FIG. 6A to provide a visual depiction.

Figure 6A:
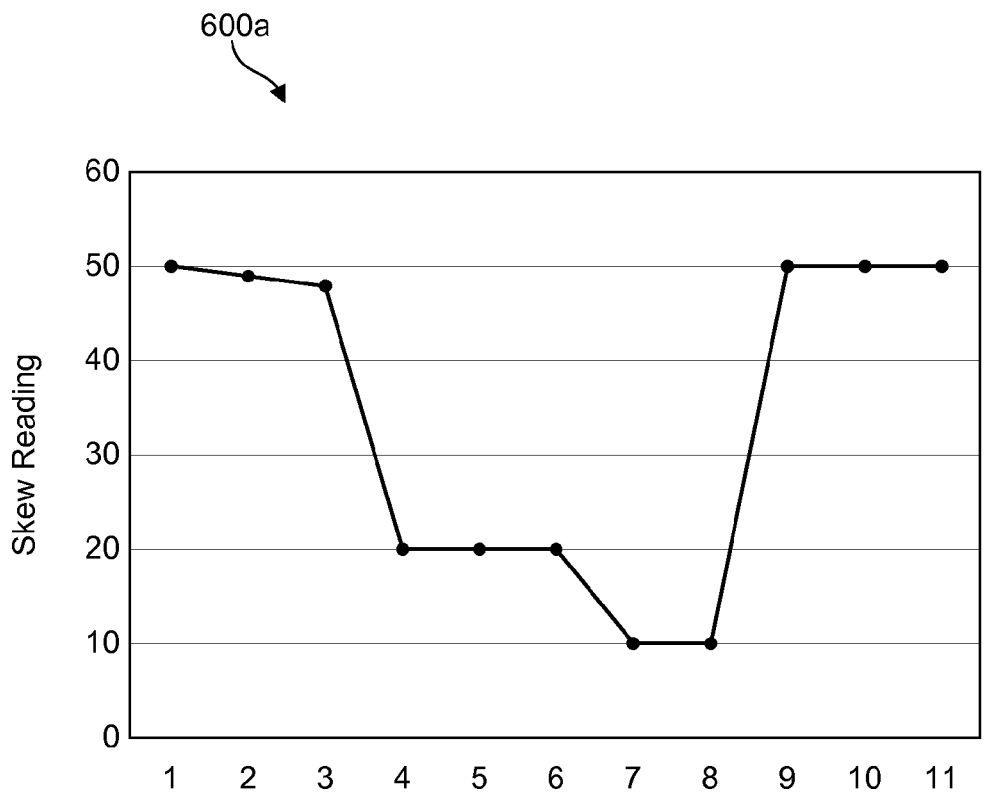
FIG. 6A is a graph showing an example of skew readings for a tape drive prior to adjusting the skew.

As shown in FIG. 6A, the high skew reading is fifty and the low skew reading is ten. The center point of this range is (50+10)/2=30. Using the method 400 of FIG. 4, the difference between the center point and a desired center point is calculated. Assuming the desired center point is zero, the difference would be 0−30=−30. This difference is then applied to the measurements taken during the calibration run, which generates a list of corresponding target skew readings, as shown in the second column 504.

The method 400 then generates a skew error signal that reflects the difference between the target skew reading 504 and the actual skew reading 502. The error signal for each skew reading is shown in the third column 506 of the table 500. As can be observed in the third column 506, the error signal is consistent for each different calibration reading 502 since the error signal is based on the difference between the target skew reading and the measured skew reading, and not the measured skew reading 502 itself. Using the error signal 506, a technician may simply adjust the skew of the tape drive 100 until the error signal is zero or close to zero.

Figure 6B:
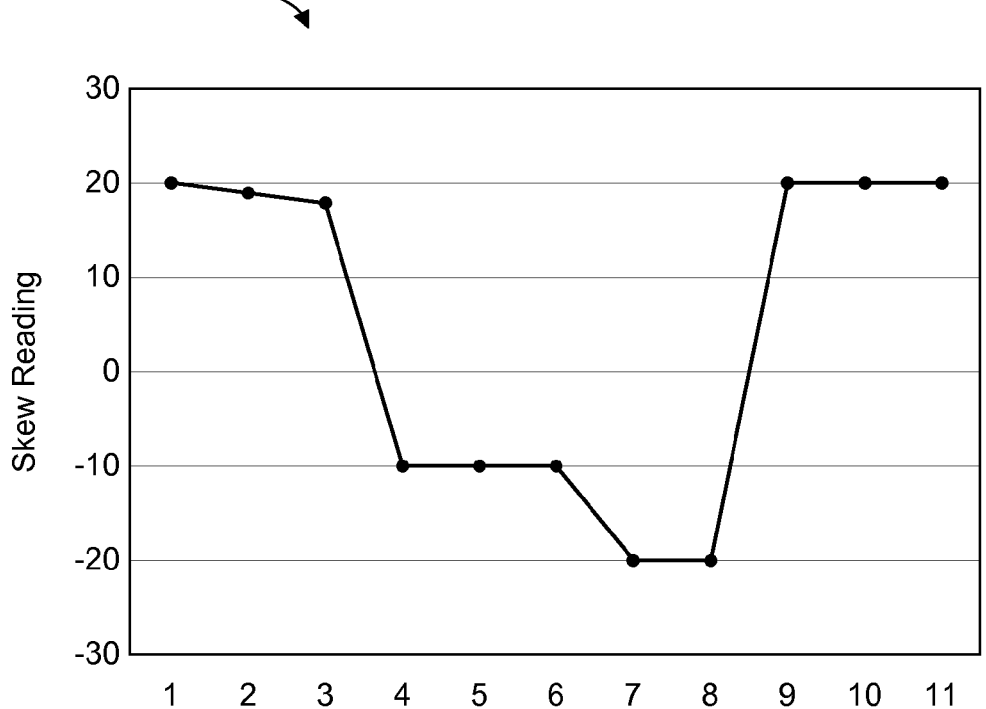
FIG. 6B is a graph showing an example of skew readings for a tape drive after adjusting the skew using a method in accordance with the invention.

For example, after adjusting the skew of the tape drive 100, the error signal is zero as illustrated in the fifth column 510. Upon performing the same calibration run discussed above, the tape drive 100 will output the skew readings illustrated in the fourth column 508, thereby bringing the actual skew readings into alignment with the target skew readings shown in the second column 504. The skew readings 508 after adjustment are visually illustrated in FIG. 6B. As shown in FIG. 6B, the skew readings of FIG. 6A have been shifted downward by thirty. As can be further observed in FIG. 6B, the center point of the range of skew readings is zero. That is, the skew readings vary by twenty above or below the center point of zero.

Figure 7:
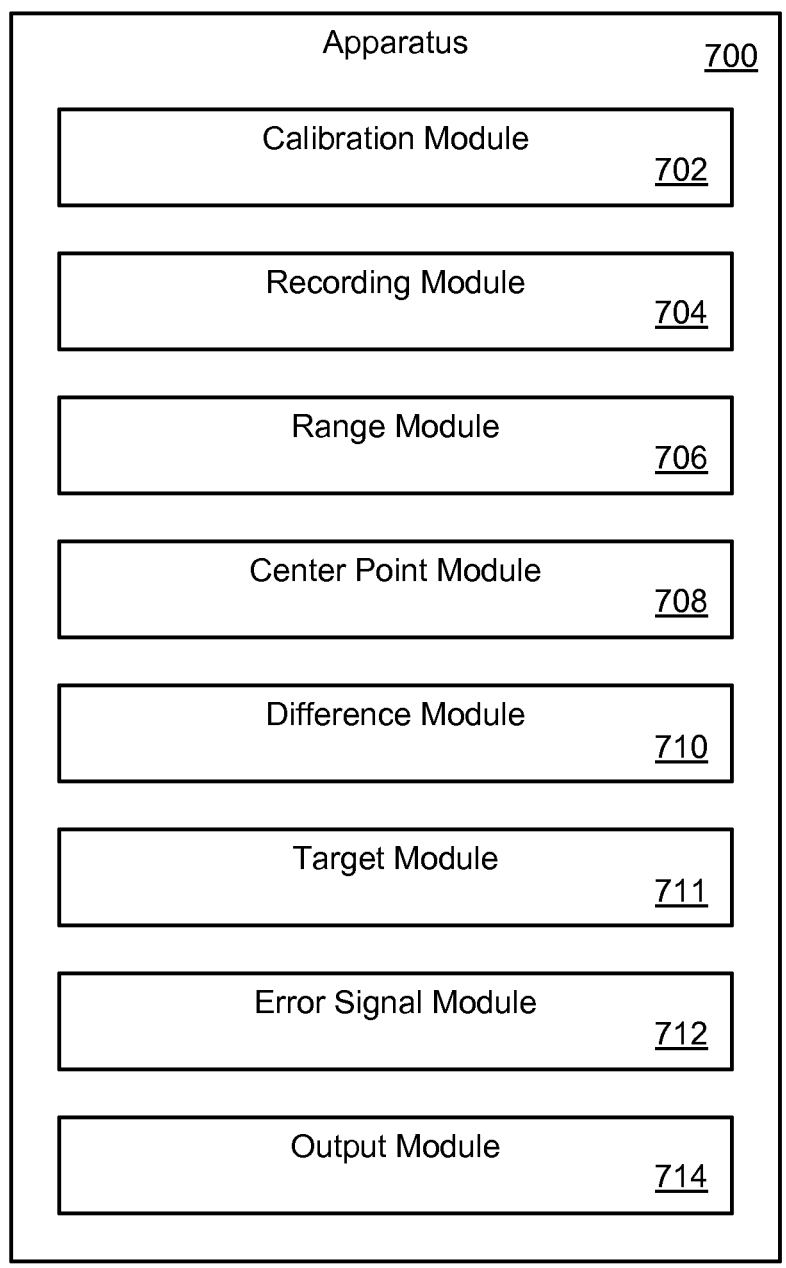
FIG. 7 is a high-level block diagram showing various modules that may be included in an apparatus in accordance with the invention.

Referring to FIG. 7, in certain embodiments, the method 400 described in association with FIG. 4 may be implemented by one or more modules. These modules may be implemented in hardware, software or firmware executable on hardware, or a combination thereof. The modules are presented only by way of example and are not intended to be limiting. Indeed, alternative embodiments may include more or fewer modules than those illustrated. Furthermore, it should be recognized that, in some embodiments, the functionality of some modules may be broken into multiple modules or, conversely, the functionality of several modules may be combined into a single module or fewer modules.

It should also be recognized that the modules may be implemented in different locations in different embodiments. For example, in certain embodiments, all or some of the modules may be implemented within a tape drive 100, such as within the firmware of a tape drive 100. In other embodiments, all or part of the modules may be implemented in a device external to a tape drive 100, such as a device used to test and/or calibrate a tape drive 100. In yet other embodiments, some modules may be implemented within a tape drive 100, while others may be implemented in devices external to a tape drive 100.

As shown in FIG. 7, in selected embodiments, an apparatus 700 in accordance with the invention may include one or more of a calibration module 702, recording module 704, range module 706, center point module 708, difference module 710, target module 711, error signal module 712, and output module 714.

As shown, a calibration module 702 may be configured to perform a calibration run of the tape drive, as previously described. This may include operating the tape drive 100 such that the magnetic tape 106 of a tape cartridge 102 is translated across the read/write head 112. During the calibration run, a recording module 704 may record skew readings from the tape drive 100 at selected intervals, such as at selected time intervals or selected distance intervals along the magnetic tape 106.

A range module 706 may then find a range for the skew readings, such as by determining a high skew reading and a low skew reading from the recorded skew readings. A center point module 708 may then calculate a center point of the range. The center point module 708 may accomplish this by adding the high skew reading to the low skew reading and dividing by two. A difference module 710 may then calculate a difference between the center point and a desired center point. A target module 711 may then apply this difference to each recorded skew reading to generate a target skew reading for each recorded skew reading. An error signal module 712 may then generate a skew error signal that reflects the difference between the target skew value and the actual skew value. An output module 714 may output the error signal to a screen or other output device so that a technician can adjust the angular position of the read/write head 112 relative to the tape 106 until the error signal is zero or close to zero.

The flowcharts and/or block diagrams in the Figures illustrate the architecture, functionality, and operation of possible implementations of systems, methods, and computer-usable storage media according to various embodiments of the present invention. In this regard, each block in the flowcharts and/or block diagrams may represent a module, segment, or portion of code, which comprises one or more executable instructions for implementing the specified logical function(s). It should also be noted that, in some alternative implementations, the functions noted in a block may occur in a different order than that illustrated in the Figures. For example, two blocks shown in succession may, in fact, be implemented in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for accurately adjusting skew in the presence of tape motion, the method comprising:
   performing a calibration run of magnetic tape in a tape drive;
   during the calibration run, recording skew readings at selected intervals;
   finding a range associated with the skew readings;
   finding a center point of the range;
   finding a difference between the center point and a desired center point;
   applying the difference to each recorded skew reading to generate a target skew reading for each recorded skew reading; and
   generating a skew error signal that reflects the difference between each recorded skew reading and each corresponding target skew reading.

2. The method of claim 1, wherein generating the skew error signal comprises displaying the skew error signal for use by a technician.

3. The method of claim 1, wherein the desired center point is zero.

4. The method of claim 1, wherein the skew error signal changes in response to adjusting an angular position of a tape head relative to the magnetic tape.

5. The method of claim 1, wherein generating the skew error signal comprises generating the skew error signal with a testing device external to the tape drive.

6. The method of claim 1, wherein generating the skew error signal comprises generating the skew error signal with the tape drive.

7. The method of claim 1, wherein the selected intervals are selected time intervals.

8. The method of claim 1, wherein the selected intervals are selected distance intervals along the magnetic tape.

9. A computer program product for accurately adjusting skew in the presence of tape motion, the computer program product comprising a non-transitory computer-readable storage medium having computer-usable program code embodied therein, the computer-usable program code comprising:
   computer-usable program code to perform a calibration run of magnetic tape in a tape drive;
   computer-usable program code to record, during the calibration run, skew readings at selected intervals;
   computer-usable program code to find a range associated with the skew readings;
   computer-usable program code to find a center point of the range;
   computer-usable program code to find a difference between the center point and a desired center point;
   computer-usable program code to apply the difference to each recorded skew reading to generate a target skew reading for each recorded skew reading; and
   computer-usable program code to generate a skew error signal that reflects the difference between each recorded skew reading and each corresponding target skew reading.

10. The computer program product of claim 9, wherein generating the skew error signal comprises displaying the skew error signal for use by a technician.

11. The computer program product of claim 9, wherein the desired center point is zero.

12. The computer program product of claim 9, wherein the skew error signal changes in response to adjusting an angular position of a tape head relative to the magnetic tape.

13. The computer program product of claim 9, wherein the computer-usable program code to generate the skew error signal is implemented within a testing device external to the tape drive.

14. The computer program product of claim 9, wherein the computer-usable program code to generate the skew error signal is implemented within the tape drive.

15. The computer program product of claim 9, wherein the selected intervals are selected time intervals.

16. The computer program product of claim 9, wherein the selected intervals are selected distance intervals along the magnetic tape.

17. An apparatus for accurately adjusting skew in the presence of tape motion, the apparatus comprising:
  a plurality of modules implemented in at least one of hardware and software operating hardware, the plurality of modules comprising:
    a calibration module to perform a calibration run of magnetic tape in a tape drive;
    a recording module to record, during the calibration run, skew readings at selected intervals;
    a range module to find a range associated with the skew readings;
    a center point module to find a center point of the range;
    a difference module to find a difference between the center point and a desired center point;
    a target module to apply the difference to each recorded skew reading to generate a target skew reading for each recorded skew reading; and
    an error signal module to generate a skew error signal that reflects the difference between each recorded skew reading and each corresponding target skew reading.

18. The apparatus of claim 17, wherein the error signal module is further configured to display the skew error signal for use by a technician.

19. The apparatus of claim 17, wherein the desired center point is zero.

20. The apparatus of claim 17, wherein the skew error signal changes in response to adjusting an angular position of a tape head relative to the magnetic tape.

21. The apparatus of claim 17, wherein the error signal module is implemented within a testing device external to the tape drive.

22. The apparatus of claim 17, wherein the error signal module is implemented within the tape drive.

23. The apparatus of claim 17, wherein the selected intervals are selected time intervals.

24. The apparatus of claim 17, wherein the selected intervals are selected distance intervals along the magnetic tape.

* * * * *